March 20, 1962 G. M. SMITH 3,026,455
DIFFERENTIAL SWITCHING AMPLIFIER
Filed July 2, 1959
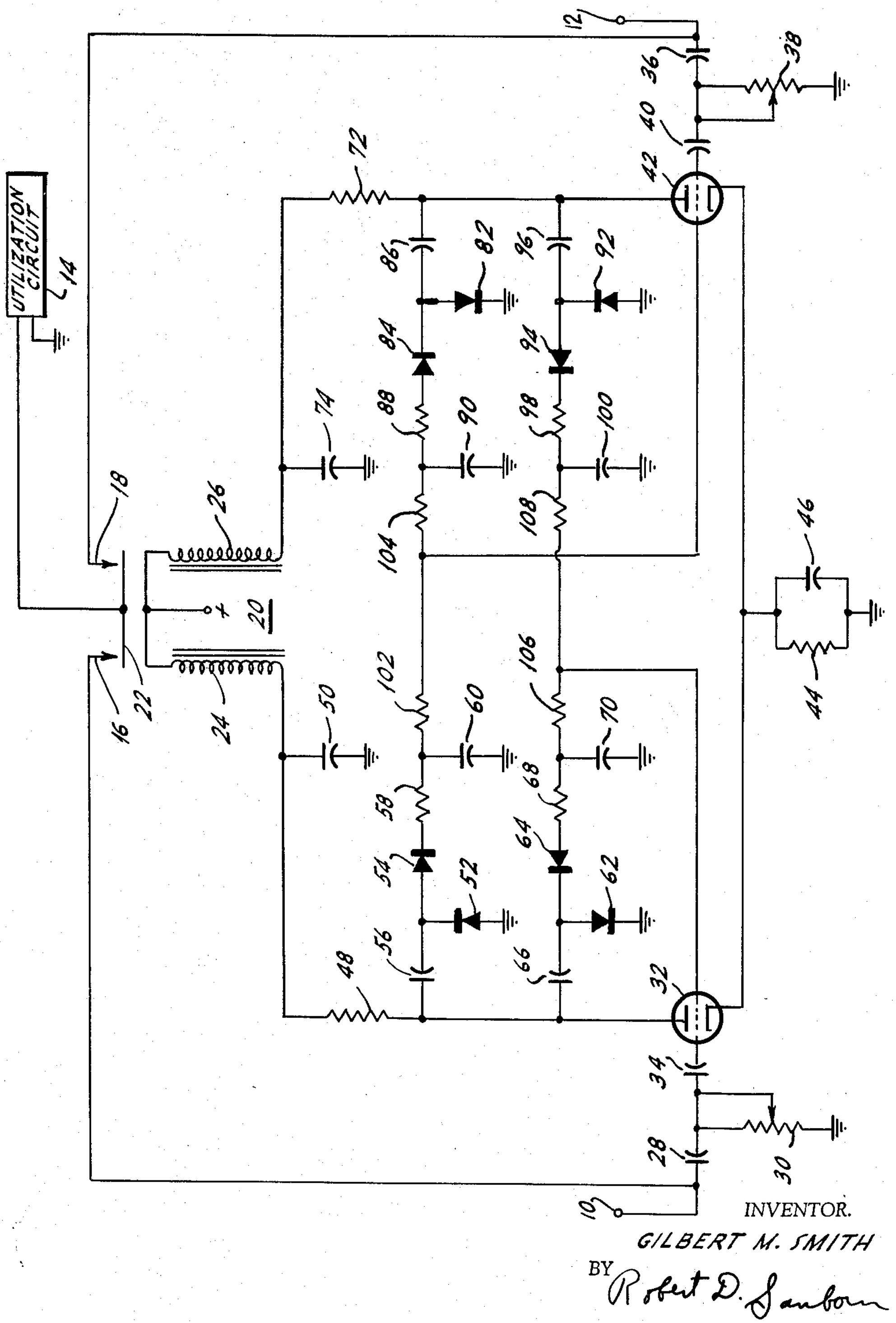
INVENTOR.
GILBERT M. SMITH
BY Robert D. Sanborn
ATTORNEY 3,026,455
Patented Mar. 20, 1962

3,026,455

DIFFERENTIAL SWITCHING AMPLIFIER

Gilbert M. Smith, Media, Pa., assignor, by mesne assignments, to Philco Corporation, Philadelphia, Pa., a corporation of Delaware Filed July 2, 1959, Ser. No. 824,662
14 Claims. (Cl. 317—149)

The present invention relates to electronic switching circuits and more particularly to differential switching amplifier circuits.

Differential switching amplifier circuits are employed to connect a selected one of two or more signal sources to a single output or utilization circuit. The selection of the source to be connected to the utilization circuit is made on the basis of the amplitudes of the signal supplied to two inputs of the differential switching amplifier. Differential switching amplifiers are employed in communication systems for connecting either the regular transmitter or a standby transmitter to the transmitting antenna. Differential switching amplifiers are also employed in diversity communication systems for switching a selected one of several receivers to the output circuit of the diversity receiving system. The selection of the receiver is usually based on the relative amplitudes of the signals supplied by the several receivers.

In the past switching in diversity receiving systems has been accomplished by connecting the several receivers to a common AGC bus. This has the disadvantage that the inactive receivers are not completely disconnected from the output device and may contribute noise signals or out-of-phase signals to the utilization circuit. Electronic switching circuits have been proposed for connecting one of two or more receivers to the output utilization device of diversity receiving systems. However these prior art circuits suffer from the disadvantage that they require a large number of active elements and/or a large signal differential to accomplish the switching action. Switching circuits for standby transmitters and the like have suffered from similar disadvantages.

Therefore it is an object of the present invention to provide an improved electronic switch circuit which is responsive to the relative amplitudes of two signals supplied thereto.

It is a further object of the present invention to provide a differential switching amplifier circuit which requires a minimum number of active elements.

Another object of the invention is to provide a differential switching amplifier circuit which is sensitive to relatively small differences in the amplitudes of the input signals.

A further object of the present invention is to provide a differential switching amplifier which will accommodate a relatively wide dynamic range of control signal amplitudes.

Still another object of the present invention is to provide a differential switching amplifier circuit in which the actuating signal is amplified more than once in each amplifying element.

These and other objects of the present invention are achieved by employing two reflex circuits, each comprising an amplifier element and two detector circuits connected in a reflex amplifier circuit. The two reflex amplifier circuits are connected together in a balance differential circuit. The output of this balanced differential circuit controls suitable relay means which accomplishes the actual change in connection from the two signal sources to the utilization circuit.

For a better understanding of the present invention together with other and further objects thereof reference should now be had to the following detailed description which is to be read in conjunction with the accompanying drawings in which the sole figure is a schematic diagram of one preferred embodiment of the invention.

In the drawing the two signal inputs to the differential switching amplifier are shown at 10 and 12, respectively. It is assumed that the signals to be supplied to the utilization circuit 14 are employed to control the differential switching amplifier circuit. This will usually be the case in practice but the invention is not to be limited to this arrangement. The connetcion from inputs 10 and 12 to the utilization circuit 14 is made by way of contacts 16 and 18 on the differential relay 20. The armature 22 of relay 20 is connected to the input of the utilization circuit 14. Relay 20 is provided with two actuating coils 24 and 26 for moving armature 22 into electrical contact with either contact 16 or contact 18. In the following description it will be assumed that if the current through coil 24 exceeds the current through coil 26, armature 22 will be moved into contact with contact 18. Similarly if the current through coil 26 exceeds the current through coil 24 a connection will be made from contact 16 to armature 22.

Capacitor 28, potentiometer 30 and capacitor 34 together from a network for coupling input 10 to the grid of a triode vacuum tube 32. Capacitor 34 is a D.C. blocking capacitor which isolates the tap on potentiometer 30 from the grid of tube 32 for direct voltages. Similarly capacitor 36, potentiometer 38 and capacitor 40 provide means for coupling input 12 to the control grid of a second electron tube 42. For reasons which will appear presently one or both of the potentiometers 30 and 38 may be replaced by a fixed resistive network.

Tubes 32 and 42 share a common cathode biasing circuit which comprises a resistor 44 connected in shunt with a bypass capacitor 46. This parallel combination is connected between the cathodes of tubes 32 and 42 and ground.

The anode load for tube 32 comprises coil 24 of relay 20 and resistor 48 which are connected in series between the source of anode supply potential represented by the plus sign (+) and the anode of tube 32. The junction of resistor 48 and coil 24 is bypassed to ground by a capacitor 50 at the frequency of the signal supplied to input 10.

Diodes 52 and 54 and capacitor 56 comprise a first voltage doubler detector circuit which is connected to the anode of tube 32. The load for this first voltage doubler detector circuit comprises resistor 58 and capacitor 60. This load circuit has a time constant which is long compared to one period of any intelligence signal amplitude modulation component present in the signal supplied to input 10. Diodes 62 and 64 and capacitor 66 form a second voltage doubler detector circuit which has as its load impedance the resistor 68 and capacitor 70. The diodes 62 and 64 are so connected that the signal appearing across capacitor 70 has a polarity which is opposite to that of the signal appearing across capacitor 60.

The anode load for electron tube 42 comprises coil 26 of relay 20 in series with resistor 72. Again the junction of coil 26 and resistor 72 is bypassed to ground by a capacitor 74 at the frequency of the signal supplied at input 12. Diodes 82 and 84 and capacitor 86 together form a third voltage doubler detector circuit. This voltage doubler detector circuit is connected to the anode of tube 42. Resistor 88 and capacitor 90 form a load circuit for the third voltage doubler detector circuit. A fourth voltage doubler detector circuit having oppositely poled detector elements is provided by diodes 92, 94, capacitor 96, resistor 98 and capacitor 100.

Resistors 102 and 104 together form a voltage adder network which connects the ungrounded terminals of capacitors 60 and 90, respectively, to the grid of tube 42. Resistors 106 and 108 form a second resistive adder network which connects the ungrounded terminals of capacitors 70 and 100, respectively, to the control grid of tube 32.

The circuit shown in the drawing operates in the following manner to control relay 20. The inputs 10 and 12 are supplied with suitable periodic control voltages. These voltages may have a carrier frequency anywhere in the range from audio frequencies to frequencies of several megacycles. The amplitude of the control signal will depend on the type of circuit supplying signals to inputs 10 and 12. In a typical diversity receiving system the amplitude of the control signals will vary with atmospheric conditions. Therefore, during the reception of a given message the amplitudes of the control signals may lie anywhere in the range from several decibels, for example 30 db, below 1 milliwatt to several decibels, for example 10 db, above 1 milliwatt. To take a specific example, the signals supplied to inputs 10 and 12, respectively, may be the intermediate frequency output signals of two diversity receivers. The signal supplied to input 10 is amplified by tube 32. The first voltage doubler detector, which includes diodes 52 and 54, causes the ungrounded terminal of capacitor 60 to assume a positive charge which is proportional in amplitude to the amplitude of the signal present at input 10. The time constant of the circuit 58—60 is preferably long compared to the carrier frequency and any signal modulation frequency present at input 10. The time constants of the detector load circuits should be short compared to the periods of fading of the control signals. Thus the signal across capacitor 60 varies only with changes in the short term average carrier frequency of the signal supplied at input 10. The other three detector circuits have similar time constants. Similarly the second voltage doubler detector, which includes diodes 62 and 64, causes the ungrounded terminal of capacitor 70 to assume a negative charge which is proportional to the average amplitude of the signal present on input 10. The third voltage doubler detector, which includes diodes 82 and 84, causes the ungrounded terminal of capacitor 90 to assume a negative potential which is proportional to the amplitude of the input signal present on input 12. The fourth voltage doubler detector circuit causes the ungrounded terminal of capacitor 100 to assume a positive charge proportional to the amplitude of the signal on input 12.

If the signals at inputs 10 and 12 are of equal amplitude and potentiometers 30 and 38 are set to provide equal proportions of the input signals to the grids of tubes 32 and 42, the voltages appearing across capacitor 60 and capacitor 90 will be of equal amplitude but opposite polarity. Therefore the junction of resistors 102 and 104 and hence the grid of tube 42 will be at ground potential. Similarly the voltage across capacitor 70 will be equal to the voltage across capacitor 100 but of opposite polarity and the junction of resistors 106 and 108 and the grid of tube 32 will be at ground potential. Since the grids of tubes 32 and 42 are at the same potential and the tubes have a common cathode bias circuit, the anode currents through the two tubes will be equal. Coils 24 and 26 will exert equal forces on armature 22.

Suppose now that the average amplitudes of the intermediate frequency signal supplied to the grid of tube 32 becomes slightly greater than the intermediate frequency signal supplied to the grid of tube 42. This may occur as a result of a slight fading of the signal supplied to input 12 or it can be brought about by an adjustment of potentiometer 30. The increased amplitude of the signal at the grid of tube 32 will cause a correspondingly greater increase in the amplitude of the IF signal at the anode of tube 32. The amplitudes of the output signals of the first and second voltage doubler detector circuits will increase. This will cause voltages appearing across capacitors 60 and 70 to have correspondingly greater amplitudes. The junction of resistor 102 with resistor 104 will now be positive with respect to ground since capacitor 60 has a positive voltage of greater amplitude than the negative voltage appearing across capacitor 90. The tube 42 acts as a D.C. amplifier so that the increase in potential on the grid of tube 42 will cause an increase in the average current through winding 26. This will tend to move armature 22 into contact with contact 16. At the same time the junction of resistors 106 and 108 is negative with respect to ground owing to the fact that the negative potential appearing across capacitor 70 has a greater amplitude than the positive potential appearing across capacitor 100. The negative potential on grid 32 causes a decrease in the average current through tube 32 and hence through coil 24. Again this tends to cause armature 22 to move into contact with contact 16. This movement of armature 22 connects input 10 to the utilization circuit 14.

It will be seen that, if the signal on input 12 exceeds in amplitude the signal on input 10, the current through coil 24 will increase and current through coil 26 will decrease causing armature 22 to shift to contact 18. It will be noted that the operating points for tubes 32 and 42 depend upon the difference in the signal levels at inputs 10 and 12 and not on the absolute amplitude of the signal supplied. Therefore the operating point of these two tubes will remain fixed at the point determined by cathode bias network 44—46 for all balanced input signals regardless of the signal level. One embodiment of the invention has been operated successfully over a range of signals from 30 db below 1 milliwatt to 9 db above 1 milliwatt without any adjustments of the potentiometers 32—38.

It will be seen that the intermediate frequency signal present on input 10, for example, is amplified in tube 32. The voltage doubling detectors provide further gain. The differential connection of the first and third detectors and the second and fourth detectors causes the difference between the direct voltages applied to grids 32 and 42, respectively, to be twice the increase in direct voltage across capacitor 60, for example. Tubes 32 and 42 act as a D.C. amplifier for the signal supplied to the grid from the junction points of the resistive adder networks 102—104 and 106—108. The increase in current in one of the windings 24 or 26 is aided by a corresponding decrease in the current through the other winding. Thus only a very small difference in the amplitudes of the signals at inputs 10 and 12 is sufficient to move the armature from one of the contacts 16 or 18 to the other. One circuit constructed to operate in the frequency range of 5 kilocycles to 2 megacycles for the signals present on input leads 10 and 12 was found to require a switching differential of approximately $\pm 8$ db at a power level of 30 db below 1 milliwatt. It will be seen that D.C. signals supplied to tubes 32 and 42, and hence the entire switching action, is dependent upon the detector characteristics. Since the diode detector elements have an exponential characteristic the circuit will respond to a smaller percentage difference in signal level at higher signal levels than at low signal levels. This tends to maintain the differential required for switching more nearly constant over the operating range. The dynamic range of input signals which will be accepted by the circuit, the differential required for switching from one of contacts 16 or 18 to the other and the circuit which will be completed by armature 22 for equal signal inputs are all controlled by adjusting either or both of potentiometers 30 and 38. Changing potentiometers 30 and 38 to provide a smaller fraction of the input signal to the grids of tubes 32 and 42 permits the circuit to respond to larger input signals without overloading while at the same time it increases the amplitude of the differential required to actuate relay 20. The circuit may be employed to switch signals other than those which control the operation of relay 20. To do this contacts 16 and 18 are disconnected from inputs 10 and 12 and connected to the source of signals to be switched. The voltage doubler detector circuits shown may be replaced with other forms of detector circuits, for example a single diode detector, with some loss in sensitivity.

Other forms of current sensitive devices may be substituted for relay 20. Furthermore coils 24 and 26 may be replaced by other impedances such as resistors and direct voltage sensitive means may be connected to the ungrounded terminals of capacitors 50 and 74. Triodes 32 and 42 may be replaced by transistors or by suitable multigrid tubes. It also lies within the scope of the invention to provide a single detector means associated with each amplifier means together with means for deriving two signals of opposite polarity from the output of each detector means.

While the invention has been described with reference to a single embodiment thereof, it will be apparent that various modifications and other embodiments thereof will occur to those skilled in the art within the scope of the invention. Accordingly I desire the scope of my invention to be limited only by the appended claims.

I claim:

1. A differential switching amplifier circuit comprising first and second amplifier stages, means for supplying a first input signal to said first amplifier stage, means for supplying a second input signal to said second amplifier stage, detector means coupled to the output of said first amplifier means and providing first and second detected signals of opposite sense, second detector means coupled to the output of said second amplifier means and providing third and fourth detected signals of opposite sense, said first and said third detected signals having the same sense, means for additively combining said first and said fourth detected signals, the output of said last-mentioned means being coupled to said first amplifier means for controlling the average signal level therein, means for additively combining said second and third detected signals, the output of said last-mentioned means being coupled to said second amplifier means for controlling the average signal level therein, and differential switching means coupled to said first and second amplifier means and responsive to the difference in the signal levels therein.

2. A differential switching amplifier circuit comprising first and second amplifier stages, means for supplying a first input signal to said first amplifier stage, means for supplying a second input signal to said second amplifier stage, first and second detector means coupled to the output of said first amplifier means, third and fourth detector means coupled to the output of said second amplifier means, said first and third detector means providing detected signals of a first sense and said second and fourth detector means providing detected signals of the opposite sense, means for additively combining the outputs of said first and fourth detector means, the output of said last-mentioned means being coupled to said first amplifier means to control the average current flow therein, means for additively combining the outputs of said second and third detector means, the output of said last-mentioned means being coupled to said second amplifier means to control the average current flow therein, and a current sensitive differential circuit switching means coupled to said first and second amplifier means and responsive to the difference in the average current flow in said two amplifier means.

3. A differential switching amplifier circuit in accordance with claim 2 wherein said current sensitive differential circuit switching means comprises a differential relay having first and second actuating coils, said first coil being connected in circuit with said first amplifier means and said second coil being connected in circuit with said second amplifier means.

4. A differential switching amplifier circuit comprising a current sensitive differential circuit switching means having first and second control terminals and a common third control terminal, first and second amplifier elements each having an output terminal, an input terminal and a terminal common to the input and output circuits of said amplifier element, means for connecting said common terminals of said two amplifier elements to a point of reference potential, a first load impedance connecting said output terminal of said first amplifier element to said first control terminal of said differential switching means, a second load impedance connecting said output terminal of said second amplifier element to said second control terminal of said differential switching means, first and second detector means coupled to said output terminal of said first amplifier element, said first detector means providing a detected signal of a first sense and said second detector means providing a detected signal of the opposite sense, third and fourth detector means coupled to the output terminal of said second amplifier element, said third detector means providing a detected signal of said first sense and said fourth detector means providing a detected signal of said opposite sense, first adder means coupled to the outputs of said first and said fourth detector means, the output of said first adder means being coupled to said input terminal of said first amplifier element, second adder means coupled to the outputs of said second and third detector means, the output of said second adder means being coupled to said input terminal of said first amplifier element, means for supplying a first input signal to said input terminal of said first amplifier element, and means for supplying a second input signal to said input terminal of said second amplifier element.

5. A differential switching amplifier circuit in accordance with claim 4 wherein said current sensitive differential circuit switching means comprises a differential relay having first and second actuating windings, one of said actuating windings being connected between said first control terminal and said common third control terminal and the other actuating coil being connected between said second control terminal and said common third control terminal of said current sensitive differential switching means.

6. A differential switching amplifier circuit comprising a current sensitive differential circuit switching means having first and second control terminals and a third common control terminal, first and second amplifier elements each having an output terminal, an input terminal and a terminal common to the input and output circuits of said amplifier element, means for connecting said common terminals of said two amplifier elements to a point of reference potential, a first load impedance connecting said output terminal of said first amplifier means to said first control terminal of said differential switching means, a second load impedance connecting said output terminal of said second amplifier element to said second control terminal of said differential switching means, first detector means coupled to said output terminal of said first amplifier element and providing first and second signals of opposite sense, second detector means coupled to the output terminal of said second amplifier element and providing third and fourth signals of opposite sense, said first and third signals being of the same sense, means for additively combining said first and said fourth detected signals, the output of said last-mentioned means being coupled to said input terminal of said first amplifier element for controlling the average current through said first amplifier element, means for additively combining said second and third detected signals, the output of said last-mentioned means being coupled to said input terminal of said second amplifier element for controlling the average current flow therein, means for connecting a source of bias potential between said third common control terminal and said point of reference potential, means for supplying a first input signal to said input terminal of said first amplifier element and means for supplying a second input signal to said input terminal of said second amplifier element.

7. A differential switching amplifier circuit as in claim 6 wherein said current sensitive differential circuit switching means comprises a differential relay having first and second actuating coils, the first one of said actuating coils being connected between said first control terminal and said third common control terminal of said current sensitive switching means and said second actuating coil being connected between said second control terminal and said third common control terminal of said current sensitive switching means.

8. A differential switching amplifier circuit comprising a differential relay having a first actuating coil connected between a first input terminal and a common terminal, and a second actuating coil connected between a second input terminal and said common terminal, first and second amplifier elements each having an anode terminal, a cathode terminal and a control terminal, a common cathode bias circuit connected between a point of reference potential and said cathode terminals of said first and second amplifier elements, a first load impedance connected from said anode terminal of said first amplifier element and said first input terminal of said relay, a second load impedance connected between said anode terminal of said second amplifier element and said second input terminal of said relay, first and second detector means coupled to said anode terminal of said first amplifier element, said first detector means providing a detected signal of a first polarity and said second detector means providing a detected signal of the opposite polarity, third and fourth detector means coupled to the anode terminal of said second amplifier element, said third detector means providing a detected signal of said first polarity and said fourth detector means providing a detected signal of said opposite polarity, first adder means coupled to the outputs of said first and said fourth detector means, the output of said first adder means being coupled to said control terminal of said first amplifier element, second adder means coupled to the outputs of said second and third detector means, the output of said second adder means being coupled to said control terminal of said second amplifier element, means for supplying a first input signal to said control terminal of said first amplifier element and means for supplying a second input signal to said control terminal of said second amplifier element.

9. A differential switching amplifier circuit as in claim 8 wherein said first, second, third and fourth detector means are voltage doubler detector means.

10. A differential switching amplifier circuit as in claim 8 wherein said first, second, third and fourth detector means have exponential output signal amplitude versus input signal amplitude characteristics.

11. A differential switching amplifier circuit comprising first and second amplifier stages, means for supplying a first input signal to said first amplifier stage, means for supplying a second input signal to said second amplifier stage, first detector means coupled to the output of said first amplifier means and providing first and second detected signals of opposite sense, second detector means coupled to the output of said second amplifier means and providing third and fourth detected signals of opposite sense, said first and second detector means having exponential output signal amplitude versus input signal amplitude characteristics, said first and said third detected signals having the same sense, means for additively combining said first and said fourth detected signals, the output of said last-mentioned means being coupled to said first amplifier means for controlling the average signal level therein, means for additively combining said second and third detected signals, the output of said last-mentioned means being coupled to said second amplifier means for controlling the average signal level therein, and differential switching means coupled to said first and second amplifier means and responsive to the difference in the signal levels therein.

12. A differential switching amplifier circuit comprising a current sensitive differential circuit switching means having first and second control terminals and a third common control terminal, first and second amplifier elements each having an output terminal, an input terminal and a terminal common to the input and output circuits of said amplifier element, means for connecting said common terminals of said two amplifier elements to a point of reference potential, a first load impedance connecting said output terminal of said first amplifier means to said first control terminal of said differential switching means, a second load impedance connecting said output terminal of said second amplifier element to said second control terminal of said differential switching means, first detector means coupled to said output terminal of said first amplifier element and providing first and second signals of opposite sense, second detector means coupled to the output terminal of said second amplifier element and providing third and fourth signals of opposite sense, said first and second detector means having exponential output signal amplitude versus input signal amplitude characteristics, said first and third signals being of the same sense, means for additively combining said first and said fourth detected signals, the output of said last-mentioned means being coupled to said input terminal of said first amplifier element for controlling the average current through said first amplifier element, means for additively combining said second and third detected signals, the output of said last-mentioned means being coupled to said input terminal of said second amplifier element for controlling the average current flow therein, means for connecting a source of bias potential between said third common control terminal and said point of reference potential, means for supplying a first input signal to said input terminal of said first amplifier element and means for supplying a second input signal to said input terminal of said second amplifier element.

13. A differential switching amplifier circuit comprising first and second amplifier stages, means for supplying a first input signal to said first amplifier stage, means for supplying a second input signal to said second amplifier stage, detector means coupled to the output of said first amplifier means and providing first and second detected signals of opposite sense, second detector means coupled to the output of said second amplifier means and providing third and fourth detected signals of opposite sense, said first and said third detected signals having the same sense, means for additively combining said first and said fourth detected signals, the output of said last-mentioned means being coupled to said first amplifier means for controlling the average signal level therein, means for additively combining said second and third detected signals, the output of said last-mentioned means being coupled to said second amplifier means for controlling the average signal level therein, and differential switching means coupled to said first and second amplifier means and responsive to the difference in signal levels therein, said differential switching means being set to one state if the ratio of the signal level in one amplifier means to the signal level in the other amplifier means is greater than a selected value and to a second state if the ratio is less than said selected value.

14. A differential switching amplifier circuit comprising a current sensitive differential circuit switching means having first and second control terminals and a common third control terminal first and second amplifier elements each having an output terminal, an input terminal and a terminal common to the input and output circuits of said amplifier element, means for connecting said common terminals of said two amplifier elements to a point of reference potential, a first load impedance connecting said output terminal of said first amplifier element to said first control terminal of said differential switching means, a second load impedance connecting said output terminal of said second amplifier element to said second control terminal of said differential switching means, first and second detector means coupled to said output terminal of said first amplifier element, said first detector means providing a detected signal of a first sense and said second detector means providing a detected signal of the opposite sense, third and fourth detector means coupled to the output terminal of said second amplifier element, said third detector means providing a detected signal of said first sense and said fourth detector means providing a detected signal of said opposite sense, first adder means coupled to the outputs of said first and said fourth detector means, the output of said first adder means being coupled to said input terminal of said first amplifier element thereby to control the current flowing therein, second adder means coupled to the outputs of said second and third detector means, the output of said second adder means being coupled to said input terminal of said first amplifier element thereby to control the current flowing therein, means for supplying a first input signal to said input terminal of said first amplifier element, and means for supplying a second input signal to said input terminal of said second amplifier element, said differential switching means being set to one state if the ratio of the current in said first amplifier element to the current in said second amplifier element is greater than a selected value and to a second state if the ratio is less than said selected value.

References Cited in the file of this patent

UNITED STATES PATENTS

| | | |
|---|---|---|
| 2,282,526 | Moore | May 12, 1942 |
| 2,384,456 | Davey | Sept. 11, 1945 |
| 2,454,807 | Kennedy | Nov. 30, 1948 |
| 2,620,400 | Snijders | Dec. 2, 1952 |
| 2,676,286 | Buchner | Apr. 20, 1954 |
| 2,682,607 | Schmitt et al. | June 29, 1954 |
| 2,881,314 | Hoge et al. | Apr. 7, 1959 |